March 11, 1930. E. V. HAFFLING 1,749,813
PRESSING OR MOLDING MEANS AND METHOD
Filed June 4, 1928

INVENTOR
ERIC Y. HAFFLING
John J. Hanrahan
ATTORNEY

Patented Mar. 11, 1930

1,749,813

UNITED STATES PATENT OFFICE

ERIC V. HAFFLING, OF STRATFORD, CONNECTICUT, ASSIGNOR TO COLUMBIA PHONOGRAPH COMPANY, INC., OF BRIDGEPORT, CONNECTICUT, A CORPORATION OF NEW YORK

PRESSING OR MOLDING MEANS AND METHOD

Application filed June 4, 1928. Serial No. 282,519.

This invention relates to improvements in pressing or molding means and methods such as are used in the manufacture of phonograph records and has specific relation to dies for this purpose.

Dies for this purpose usually include channels for the passage of steam and cold water whereby the dies may be alternately heated and cooled, to enable of the pressing and setting of the molding material. This material is usually thermoplastic such as shellac compositions and cellulose esters, although other materials such as artificial resins are also used in the manufacture of sound records. In use, a matrix having the sound grooves therein, is secured to the die and heated or cooled as required.

Any method of heating and cooling may be employed in connection with the present invention, which has particular relation to the manner of securing the matrix.

An object of this invention is to provide improved means for securing or sealing in the mold the material being pressed or molded, so as to prevent escape of any of said material prior to the full pressure being applied thereto.

A more specific object is to provide means having the characteristics stated, and which also serves to connect the matrices to the dies.

A further object of the invention is to provide spring supported clamping rings for securing the outer periphery of the matrix.

Yet a further and more specific object of the invention is to provide means for clamping the matrices, the upper and lower clamping means including complemental parts adapted to come in contact before the final pressure is applied to the press to prevent the escape of the material being molded or pressed.

A further object is to provide an improved method of molding the method consisting in partly closing the press so as to substantially spread the molding material over the matrices, to seal the material within the press while the same is partially closed, and finally to apply full pressure to the material, the sealing preventing escape of the material.

A further object of the invention is to provide yieldingly mounted matrix clamping rings and dies for receiving such rings, the parts being so constructed and arranged that when the press is fully closed solid portions of the dies are in engagement to prevent crushing of the matrix holding means.

A still further object is to provide matrix clamping rings which are spring cushioned, the springs acting to move the rings and outer peripherial portion of the matrix outwardly when the pressure is released whereby to loosen the record from the matrix.

With the foregoing and other objects in view, the invention resides in certain novel features of construction, combination and arrangement of parts as will be hereinafter more fully described and pointed out in the appended claims.

In the accompanying drawing, there is, for the purpose of illustration, shown one embodiment of the invention. Many changes will readily suggest themselves to those skilled in the art, and it is therefore to be understood that the drawing and the following detailed description is by way of illustration only, and that reference must be had to the attached claims for a statement of the limitations of the invention.

Figure 1:
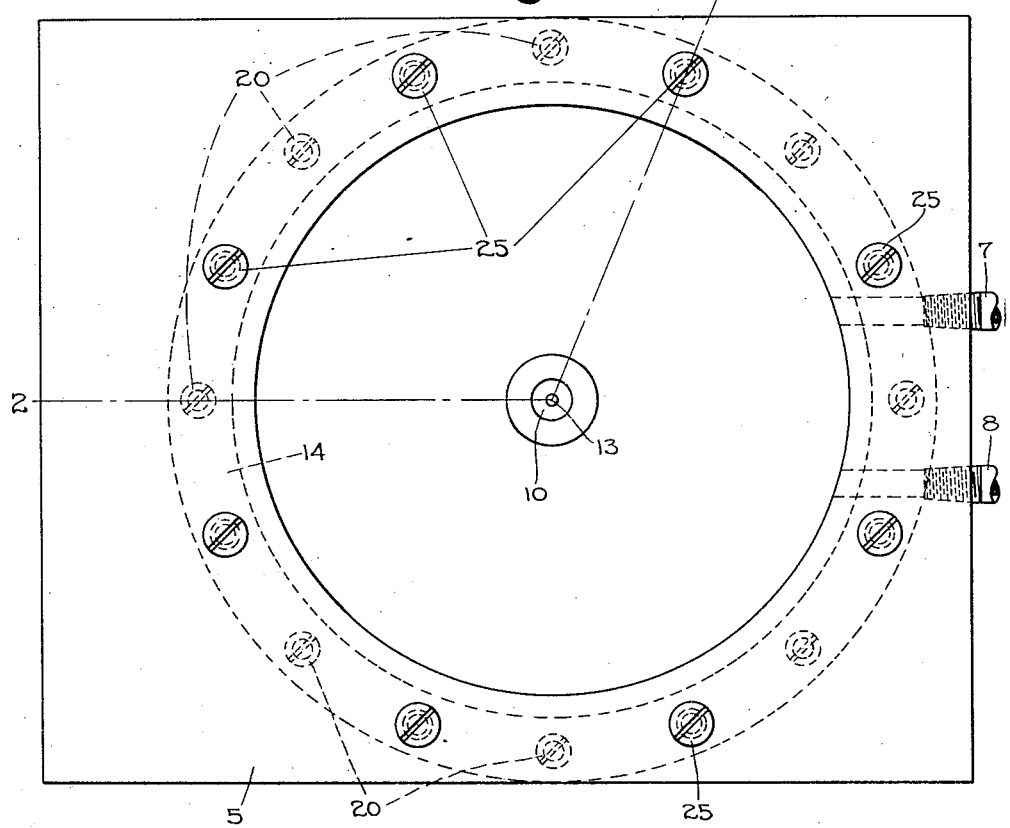
Fig. 1 is a plan view of a die having the invention applied thereto.
Figure 2:
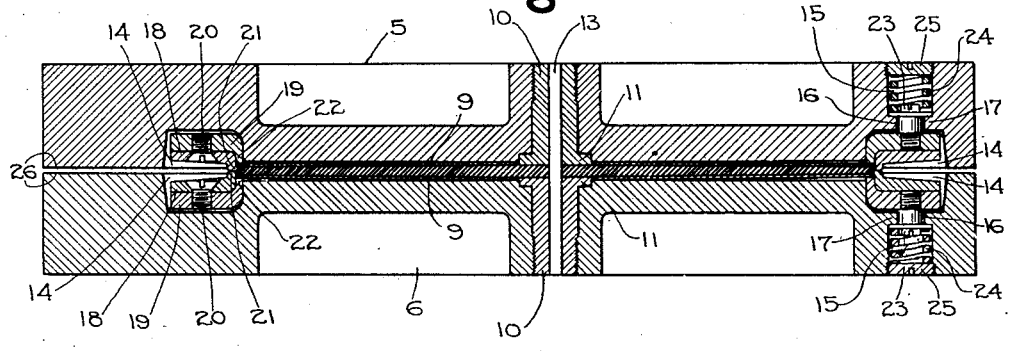
Fig. 2 is a sectional view on the line 2—2 of Fig. 1.

Referring in detail to the drawing, there is shown a pair of dies 5 and 6, inlets and outlets 7 and 8, for the heating and cooling fluid being shown in Fig. 1. The path of travel of the heating and cooling fluid through the dies is not shown, since this forms no part of the present invention, and any desired heating and cooling arrangement may be used. Each of the dies 5 and 6 carries a matrix 9, the matrices being arranged in opposed relation.

The faces of the dies against which the matrices are clamped incline outwardly and downwardly from their central portion. The central portion of each of the upper and lower matrices 9 is clamped to the respective dies by means of bolts 10 having the edge portion of their heads 11 beveled as indicated, and engaging the beveled surfaces of the matrices. These bolts 10 have openings 13 therethru, for the passage of centering pins. While this particular means for holding the central portion of the matrix may be used it is immaterial to the present invention, the only requirement being that some satisfactory means be provided for accomplishing this purpose.

In their outer portions each of the dies is provided with a circular depression or groove 14, in their opposed faces, and with sockets 15 in their exposed faces. Apertures 16 extend through a web 17 formed between the grooves 14 and the sockets 15 to provide a passageway from the sockets through to the grooves.

Disposed in the grooves 14 comprising upper and lower parts 18 and 19 respectively secured together as by means of screws 20 is the matrix clamping ring. Since the means for clamping the matrix to each of the dies is the same, a description of one will suffice for both. The upper portion 18 of the clamping ring includes a lip 21 adapted to be disposed over the outer edge portion of the shoulder 22 of the lower portion 19 of the clamping ring whereby the outer edge of the matrix is securely clamped between said parts and record material is prevented from entering under the edge of the matrix.

A bolt 23 has its head disposed in a socket 15 and extends through the opening 16 and has threaded engagement with the clamping ring. Disposed in the socket is a coil spring 24 bearing at one end against the head of bolt 23, and contacting with a plug 25 at its other end. This plug is threaded into the socket and its position may be varied, to vary the pressure of the spring, should that be found necessary.

In operation, when the dies are apart, the springs 24 act to move the clamping rings outwardly whereby the rings are spaced a slight distance from the bottom of the circular grooves 14, and the outer edge portion of the matrix is raised a slight distance away from the face of the die, as, for example, twenty one-thousandths (20/1000). This, of course is partially due to the face of the die being inclined. The surface 26 of the die at the outer side of the depression 14, is of such height as to form a landing so that when the dies are fully closed, and the clamping rings have been forced in against the action of the springs 24, the portions 26 of the respective dies will be in contact. From this it will be seen that the surface of the matrix is disposed below the surface of the landings 26 a distance equal to the thickness of lip 21 of part 18 of the clamping ring.

In the molding operation, the material may be placed on the lower matrix near the center thereof in the form of a biscuit, and as the dies are slowly closed, the central portion of the matrix will first engage the material and will spread it over the matrices. Formerly, as the dies closed, a portion of the material escaped out of the press beyond the clamping rings, since the material may tend to move in one direction and not move in circular form over the matrices. Poor product would result, since there would not be sufficient material remaining between the matrices for full pressure to be applied. This was true because the clamping rings prevented the matrices from moving closer together than twice the thickness of that portion of a clamping ring projecting over the edge of the matrix.

With the present invention however, lips 21 of the clamping rings come together before any considerable pressure is applied to the material, and serve to lock the material in the die, and cause it to completely fill the space bounded by the rings and matrices. Later should there be a surplus of material, it will force its way out between the contacting portions of the rings, when the full pressure is applied. However, since the quantity is carefully regulated, the surplus will be inconsequential, and full pressure will be applied to the material.

After the lips 21 of the clamping rings have come into contact, further pressure is of course applied to straighten the matrices against the dies and the clamping rings move into the grooves 14 against the action of springs 24, the pressure of the contact between the portions 21 constantly increasing. By the time the final pressure is applied to the material between the matrices, the opposed surfaces or landings 26 of the upper and lower dies are in contact, and the clamping rings are fully within the recesses or grooves 14.

Having thus described the invention, what I claim is:—

1. In combination, a die, a matrix, and cushion means for securing the matrix to the die.

2. In combination, a die having an annular groove in one face, a matrix disposed on said face, and against that portion of the die bounded by said groove, means for clamping the edge of said matrix, said means disposed for the most part in said groove, and yielding means for projecting said clamping means slightly beyond said groove, said yielding means permitting movement of said clamping means into the said groove during the formaton of an article on said matrix.

3. In combination, a die having a landing, a matrix disposed on said die, means clamping the edge of said matrix, and resilient means mounting the clamping means whereby said clamping means may be moved to a position flush with the landing of the die.

4. In combination, a die, a matrix disposed on said die, means clamping the edge of the matrix, and cushioning means mounting the clamping means.

5. In combination, a die having a groove in one face, a matrix on said face, clamping means for said matrix, said means disposed to enter said groove, and resilient means for projecting said clamping means.

6. In combination, a die having a groove in one face, a matrix on said face, clamping means for said matrix, said clamping means disposed to enter said groove, a socket below said groove, and a coil spring in said socket and acting to resist movement of said clamping means toward the bottom of said groove.

7. In combination, a die having an annular groove in one face, a matrix on said face, clamping means for said matrix, said clamping means disposed to enter said groove, sockets in the other face of said die, said sockets equally spaced and arranged in alignment with said annular groove, bolts extending from said sockets and engaging said clamping means to prevent its separation from the die, and coil springs disposed in said sockets and bearing against said bolts to resist movement of the clamping means toward the bottom of said annular groove.

8. A device as in claim 7 including means to vary the tension of said coil springs.

9. In combination, a pair of dies, a matrix carried by each of said dies and arranged in opposing relation, means overlapping and securing said matrices to the respective dies, said means on the respective dies adapted to come into contact as the dies move toward each other, whereby to seal the space between the matrices, and said means on the respective dies also adapted to retreat as the dies move together.

10. In combination, a pair of dies, a matrix, means on the respective dies adapted to come into contact as the dies move toward each other whereby to seal the space between the dies, said means on one of the dies securing the matrix to that die, and means resiliently mounting the matrix securing means.

11. In combination, a pair of dies, a matrix on one of said dies, and resiliently mounted means on the respective dies adapted to come into contact as the dies move toward each other whereby to seal the space between the dies, the means on the die carrying the matrix serving also to secure the matrix to the die.

12. In combination, a pair of dies, a matrix on each of said dies; and means on the respective dies adapted to secure the matrix to the dies and to come into contact as the dies move toward each other whereby to seal the space between the dies, and means resiliently mounting one of said means whereby the same does not prevent movement of the dies toward each other.

13. In combination, a die, a matrix disposed on said die, means clamping the edge of the matrix, and cushioning means mounting the clamping means, said cushioning means normally acting to maintain the peripheral edge portion of the matrix spaced above the surface of the die.

14. In combination, a pair of jaws, a matrix, means for closing the space between said jaws as they move together to prevent the escape of material from between the jaws, said means on one of the jaws securing the matrix to said jaw, and means resiliently mounting the matrix securing means.

Signed at Bridgeport, in the county of Fairfield, and State of Connecticut, this 31st day of May, A. D. 1928.

ERIC V. HAFFLING.